(12) United States Patent
Kato

(10) Patent No.: US 7,336,406 B2
(45) Date of Patent: Feb. 26, 2008

(54) SCANNING OPTICAL DEVICE AND COLOR IMAGE FORMING APPARATUS USING THE SAME

(75) Inventor: Manabu Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 11/361,075

(22) Filed: Feb. 22, 2006

(65) Prior Publication Data
US 2006/0209373 A1  Sep. 21, 2006

(30) Foreign Application Priority Data
Mar. 15, 2005  (JP) ............... 2005-073117

(51) Int. Cl.
*G02B 26/08* (2006.01)
(52) U.S. Cl. .................................. 359/204
(58) Field of Classification Search ............... 359/204
See application file for complete search history.

(56) References Cited

U.S. PATENT DOCUMENTS

| 5,581,392 A | * | 12/1996 | Hayashi ................ 359/205 |
| 6,038,053 A | | 3/2000 | Kato |
| 6,046,835 A | * | 4/2000 | Yamawaki et al. ....... 359/205 |
| 6,075,636 A | | 6/2000 | Sekikawa |
| 6,304,360 B1 | * | 10/2001 | Sekikawa ................ 359/204 |
| 6,346,957 B1 | * | 2/2002 | Maruyama .............. 347/115 |
| 7,034,973 B2 | * | 4/2006 | Sakai ..................... 359/205 |
| 2002/0118428 A1 | | 8/2002 | Ohno |
| 2003/0025784 A1 | * | 2/2003 | Sato et al. ............... 347/244 |
| 2003/0137710 A1 | | 7/2003 | Nishikiuchi et al. |
| 2003/0179429 A1 | * | 9/2003 | Takanashi et al. ........ 359/205 |
| 2004/0047017 A1 | | 3/2004 | Ohno |
| 2004/0156084 A1 | | 8/2004 | Takayama |
| 2005/0024481 A1 | | 2/2005 | Takayama |

FOREIGN PATENT DOCUMENTS

| JP | 3-150521 A | 6/1991 |
| JP | 11-223783 A | 8/1999 |
| JP | 2001-281575 A | 10/2001 |

* cited by examiner

*Primary Examiner*—Stephone B. Allen
*Assistant Examiner*—Jade Callaway
(74) *Attorney, Agent, or Firm*—Canon USA., Inc., IP Division

(57) ABSTRACT

At least one exemplary embodiment is directed to a scanning optical device includes an incidence optical system that causes the principal rays of all of a plurality of light fluxes emitted from a light source element comprising a plurality of light-emitting parts on the same substrate to impinge upon the same deflecting surface of a light deflector at different angles in a plane orthogonal to a main scanning plane, and be deflected to form a latent image on a plurality of different photosensitive scanning surfaces, thereby achieving a scanning optical device and an image forming apparatus that are small in size and inexpensive.

7 Claims, 7 Drawing Sheets

ONLY 4 CHIEF RAYS ARE SHOWN.

SCANNING OPTICAL DEVICE AND COLOR IMAGE FORMING APPARATUS USING THE SAME

This application claims the priority of Japanese Application No. 2005-073117 filed Mar. 15, 2005, which is hereby incorporated by reference herein in its entirety.

BACKGROUND OF THE INVENTION

1. Field of the Invention

The present invention relates to a scanning optical device suitable for use in an image forming apparatus, such as a laser beam printer (LBP), a digital copier, or a multifunctional printer which performs an electrophotographic process. In particular, the present invention relates to a scanning optical device configured to be used in a tandem color image forming apparatus that can form a color image by guiding a plurality of light fluxes to a plurality of surfaces to be scanned.

2. Description of the Related Art

A known scanning optical device, such as an LBP, performs image recording by using a light deflector such as a rotating polygon mirror to periodically deflect light modulated according to image signals and emitted from a light source element. An imaging optical element, which can have f-θ characteristics, is adapted to allow the modulated light to converge on a surface of a photosensitive recording medium (photosensitive drum). The recording medium is thus optically scanned, thereby performing image recording.

FIG. 9 is a schematic diagram showing a substantial part of a known scanning optical device.

Referring to FIG. 9, light rays diverging from a light source element 1 are converted to substantially parallel light by a collimating lens 2, are limited by a diaphragm 3, and then enter a cylindrical lens 4, which can have predetermined refractive power, only in the sub scanning direction.

The parallel light rays that have entered the cylindrical lens 4 exit in parallel in a main scanning plane while, in a sub scanning plane, they converge to form a linear image on a deflecting surface (reflecting surface) 5a of a light deflector 5 such as a polygon mirror.

The light rays deflected from the deflecting surface 5a of the light deflector 5 are guided via an imaging optical element 6, which can have f-θ characteristics, onto the surface of a photosensitive drum 8 serving as a surface to be scanned. Rotating the light deflector 5 in a direction indicated by an arrow "A" allows optical scanning over the surface of the photosensitive drum 8 in a direction indicated by an arrow "B", thereby recording image information.

As the use of color documents is becoming widespread in offices, image forming apparatuses, such as LBPs and digital copiers, are required to output color images at high speed. Under such an environment, a type of color image forming apparatus that becomes dominant, because of its high productivity, is a so-called tandem color image forming apparatus, in which a scanning optical device, a photosensitive member, and a developing unit are prepared for each color and arranged in parallel.

There are various types of known scanning optical devices configured to be used in such a tandem color image forming apparatus. For example, Japanese Patent Laid-Open No. 11-223783 discusses a color image forming apparatus in which a plurality of scanning optical devices corresponding to (four) respective colors are arranged in parallel. In addition, Japanese Patent No. 2725067 discusses an image forming apparatus in which a light deflector and imaging optical element (f-θ lenses) disposed in a light path between the light deflector and the surface of a photosensitive drum are shared among a plurality of light fluxes corresponding to (four) respective colors.

However, these scanning optical devices generally require several imaging optical elements (f-θ lenses) according to the number of colors. Moreover, since an incidence optical system disposed in a light path between a light deflector and a light source element cannot be easily shared among colors, a plurality of identical incidence optical systems can be prepared.

Therefore, scanning optical devices configured to be used in a tandem color image forming apparatus are more complex in structure and more expensive in cost, compared to the known single scanning optical device shown in FIG. 9.

Japanese Patent Laid-Open No. 2001-281575 discusses a scanning optical device in which an incidence optical system is shared among colors.

However, in this scanning optical device, the principal rays of four light fluxes corresponding to respective colors are spaced along a direction parallel to the rotational axis of the light deflector. This structure requires a large light deflector to allow the spatial separation of the four light fluxes on the deflecting surface.

In other words, since, in the sub scanning plane, the principal rays of the four light fluxes corresponding to the respective colors enter the deflecting surface of the light deflector at a right angle, the principal rays of the four light fluxes cannot be spatially separated on the deflecting surface without increasing the size of the light deflector.

SUMMARY OF THE INVENTION

At least one exemplary embodiment is directed to a scanning optical device includes a monolithic multi-laser, which can have a plurality of light-emitting parts; a light deflector configured to deflect, on the same deflecting surface, all of a plurality of light fluxes emitted from the plurality of light-emitting parts; an incidence optical system disposed in a light path between the monolithic multi-laser and the light deflector, and configured to cause the principal rays of all the plurality of light fluxes to enter the same deflecting surface of the light deflector at different angles in a sub scanning section; a separation optical system configured to direct the plurality of light fluxes deflected on the same deflecting surface of the light deflector into different surfaces to be scanned; and an imaging optical system configured to cause the plurality of light fluxes deflected on the same deflecting surface to form images on the different surfaces to be scanned.

According to a second exemplary embodiment, the scanning optical device of the first aspect further includes a diaphragm disposed in the light path between the monolithic multi-laser and the light deflector, wherein the incidence optical system is configured to cause all the plurality of light fluxes emitted from the plurality of light-emitting parts to pass through a same aperture of the diaphragm.

According to a third exemplary embodiment, a scanning optical device includes a light source element, which can have a plurality of light-emitting parts; a diaphragm; a light deflector configured to deflect, on the same deflecting surface, all of the plurality of light fluxes emitted from the plurality of light-emitting parts; an incidence optical system disposed in a light path between the diaphragm and the light deflector, and the incidence optical system being configured to cause all of the plurality of light fluxes emitted from the plurality of light-emitting parts to pass through a same aperture of the diaphragm and being configured to cause the principal rays of all of the plurality of light fluxes to enter the same deflecting surface of the light deflector at different angles in a sub scanning section; a separation optical system configured to direct the plurality of light fluxes deflected on the same deflecting surface of the light deflector into different surfaces to be scanned; and an imaging optical system configured to cause the plurality of light fluxes deflected on the same deflecting surface to form images on the different surfaces to be scanned.

According to a fourth exemplary embodiment, in the scanning optical device of the third aspect, the light source element has a structure in which a plurality of monolithic multi-lasers, each which can have a plurality of light-emitting parts, are spaced apart.

According to a fifth exemplary embodiment, in the scanning optical device of the first or third aspect, an angular difference θs in radians, in the sub scanning direction, between the principal rays of adjacent light fluxes of a plurality of light fluxes incident on the same deflecting surface of the light deflector and deflected from the same deflecting surface onto the different surfaces to be scanned, satisfies $$\theta s > (1.64 \times \lambda \times |\beta so|)/\rho$$

where λ is the oscillation wavelength of the light fluxes, βso is the lateral magnification of the imaging optical system in the sub scanning direction, and ρ is a spot diameter in the sub scanning direction on a surface to be scanned.

According to a sixth exemplary embodiment, in the scanning optical device of the first aspect, the monolithic multi-laser is a surface emitting laser, which can have four or more light-emitting parts.

According to a seventh exemplary embodiment, in the scanning optical device of the first aspect, the number of light-emitting parts of the monolithic multi-laser is "n" times the number of the surfaces to be scanned, where "n" is an integer equal to or greater than two.

According to an eighth exemplary embodiment, in the scanning optical device of the first or third aspect, the imaging optical system includes an imaging lens through which all of a plurality of light fluxes deflected on the same deflecting surface of the light deflector pass.

According to a ninth exemplary embodiment, in the scanning optical device of the first or third aspect, the separation optical system includes mirrors for each of a plurality of light fluxes deflected on the same deflecting surface of the light deflector.

According to a tenth exemplary embodiment, in the scanning optical device of the second or third aspect, the absolute value of the lateral magnification βsi, between the diaphragm and its conjugate point in the sub scanning direction, of the incidence optical system satisfies $|\beta si| \leq 1$.

According to an eleventh exemplary embodiment, in the scanning optical device of the tenth aspect, the lateral magnification βsi, between the diaphragm and its conjugate point in the sub scanning direction, of an optical system disposed in a light path between the diaphragm and the light deflector, satisfies $1/20 < |\beta si| < 1/3$.

According to a twelfth exemplary embodiment, in the scanning optical device of the second or third aspect, the diaphragm is disposed closer to the monolithic multi-laser than the diaphragm is to the light deflector, in a light path from the monolithic multi-laser to the light deflector.

According to a thirteenth exemplary embodiment, in the scanning optical device of the first or third aspect, the different surfaces to be scanned are located on different image carriers.

According to a fourteenth exemplary embodiment, a color image forming apparatus includes the scanning optical device of the first or third aspect, a plurality of photosensitive members corresponding to the respective plurality of surfaces to be scanned; a plurality of developing units corresponding to the respective plurality of photosensitive members and configured to develop static latent images, which are formed on the respective photosensitive members through scanning with light fluxes by the scanning optical device, into a toner image; a plurality of transfer units corresponding to the respective plurality of developing units and configured to transfer the developed toner image to a transfer medium; and a fuser configured to fuse the transferred toner image to the transfer medium.

According to a fifteenth exemplary embodiment, the color image forming apparatus of the fourteenth aspect further includes a printer controller configured to convert code data inputted from an external device into an image signal, and to input the image signal to the scanning optical device.

According to a sixteenth exemplary embodiment, a color image forming apparatus includes a plurality of scanning optical devices of the first or third aspect; a plurality of photosensitive members corresponding to the respective plurality of surfaces to be scanned; a plurality of developing units corresponding to the respective plurality of photosensitive members and configured to develop static latent images, which are formed on the respective photosensitive members through scanning with light fluxes by the plurality of scanning optical devices, into a toner image; a plurality of transfer units corresponding to the respective plurality of developing units and configured to transfer the developed toner image to a transfer medium; and a fuser configured to fuse the transferred toner image to the transfer medium.

According to a seventeenth exemplary embodiment, the color image forming apparatus of the sixteenth aspect further includes a printer controller configured to convert code data inputted from an external device into an image signal, and to input the image signal to the plurality of scanning optical devices.

At least one exemplary embodiment is directed to the angular differences in the sub scanning direction that are required for separating, on the same deflecting surface of the light deflector, a plurality of light fluxes emitted from a plurality of light-emitting parts located on the same substrate, using an incident optical system, which can have a simple structure, without increasing the size and cost of the entire apparatus. Thus, the plurality of light fluxes from the single light source element are guided to the same deflecting surface of the light deflector by the shared incidence optical system, deflected by the same deflecting surface, and directed by the separation optical system composed of a plurality of separation optical elements into different photosensitive drums corresponding to respective colors. A scanning optical device and an image forming apparatus that are small in size and low in cost are thus achieved.

Further features of the present invention will become apparent from the following description of exemplary embodiments with reference to the attached drawings.

BRIEF DESCRIPTION OF THE DRAWINGS

FIG. 5A shows only the principal rays of four light fluxes. FIG. 5B shows a principal ray and marginal rays.

DESCRIPTION OF THE EMBODIMENTS

Figure 1:
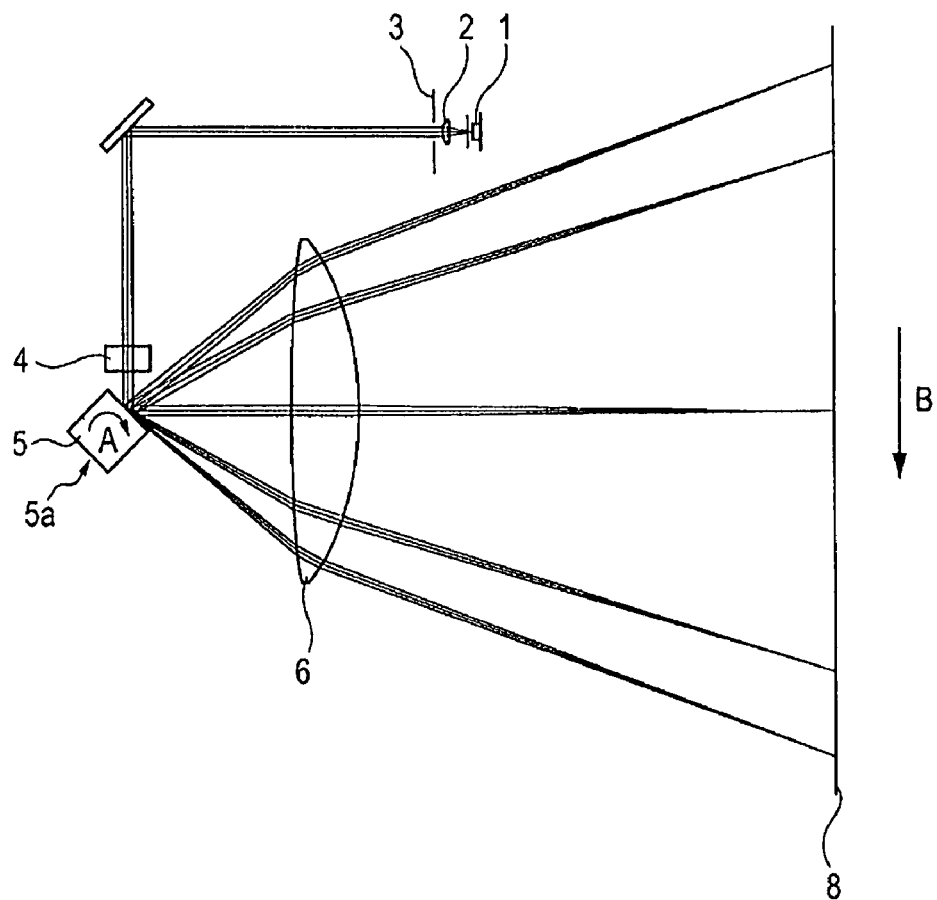
FIG. 1 shows a plane of a scanning optical device in the main scanning plane, according to a first exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Notice that similar reference numerals and letters refer to similar items in the following figures, and thus once an item is defined in one figure, it may not be discussed for following figures.

The first exemplary embodiment employs a light source, which can have three or more light-emitting parts. A vertical cavity surface emitting laser (Vcsel) is preferably used, because of its structure in which light is emitted in the direction orthogonal to a semiconductor substrate. Using such devices it is much easier to increase the number of light-emitting parts, achieve two-dimensional parallel integration, and define the layout of light-emitting parts, compared to the case of known end-face emitting semiconductor lasers.

With the use of such a light source, it is possible to separate light fluxes, which can have different colors and which are emitted from the light source that can have a plurality of light-emitting parts, on the same surface. Since a plurality of light fluxes can be directed to any photosensitive drum for forming a single color, it becomes possible to increase the speed of scanning by the use of a so-called multibeam scanning technique.

In such environments, the present embodiment provides a structure in which, without increasing the size of the entire apparatus and the complexity of its structure, a plurality of light fluxes from a light source, which can have a plurality of light-emitting parts on the same surface, are shaped by a shared incidence optical system, and a plurality of light fluxes deflected on the same deflecting surface of a light deflector are directed to photosensitive drums for respective colors by a separation optical system, such as a mirror, thereby achieving a scanning optical device and an image forming apparatus that are simple in structure, small in size, and inexpensive.

A Vcsel to be used in the present embodiment includes four or eight light-emitting parts. Although the number of light-emitting parts can be any number equal to or greater than two, in at least one exemplary embodiment four or more light-emitting parts be included to achieve high speed scanning.

First Exemplary Embodiment

FIG. 1 shows a plane of a scanning optical device according to the first exemplary embodiment. A separation optical system, which will be described below and shown in FIG. 3, is omitted from FIG. 1.

Figure 2:
FIG. 2 shows a plane in the sub scanning plane extending from a light source element to a light deflector in the scanning optical device, according to the first exemplary embodiment.
Figure 3:
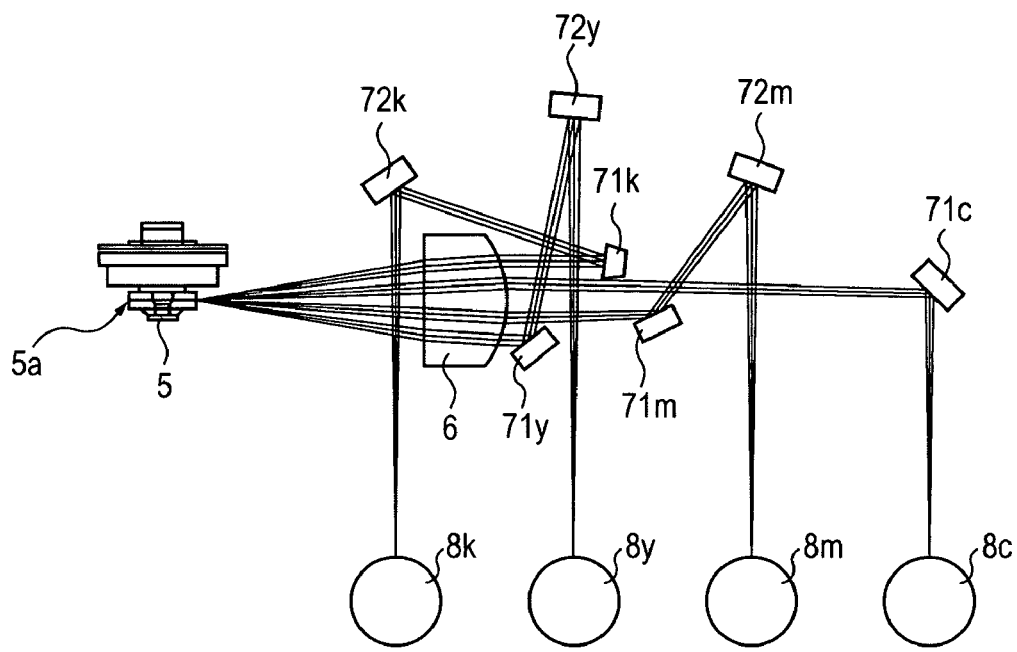
FIG. 3 shows a plane in the sub scanning plane extending from the light deflector to a surface to be scanned in the scanning optical device, according to the first exemplary embodiment.

FIG. 2 and FIG. 3 each show a plane of the scanning optical device according to the first exemplary embodiment. FIG. 2 shows light paths from a light source element 1 to a light deflector (polygon mirror) 5, while FIG. 3 shows light paths from the light deflector 5 to a surface to be scanned (photosensitive drum) 8, which will hereinafter be referred to as the "scanned surface".

At least one exemplary embodiment, a main scanning plane is shown as a plane whose normal is the rotational axis of a light deflector, while a sub scanning plane is shown as a plane that includes the optical axis of an imaging optical system and is orthogonal to the main scanning plane.

At least one exemplary embodiment, the main scanning direction is a direction that is orthogonal to the optical axis, which is defined in the main scanning plane, of the imaging optical system (i.e., direction in which light fluxes are moved for scanning), while the sub scanning direction is a direction that is orthogonal to the optical axis, which is defined in the sub scanning plane, of the imaging optical system (i.e., moving direction of image carriers).

A semiconductor laser serving as the light source element 1 is a Vcsel, which can have four light-emitting parts and which are arranged along the sub scanning direction, and are not spaced from each other in the main scanning direction.

Therefore, the four light-emitting parts can be treated as a single point in FIG. 1, which illustrates a main scanning plane of the scanning optical device. Since four light fluxes emitted from the four light-emitting parts are completely superimposed on one another, only one of the four light-emitting parts is shown in FIG. 1. After four diverging light fluxes 11$k$, 11$c$, 11$m$, and 11$y$ from the light source element 1 are converted to four parallel light fluxes by a shared collimating lens 2, the width of the light fluxes in the main scanning direction and the width of the light fluxes in the sub scanning direction are limited by a diaphragm 3.

The first exemplary embodiment uses an underfilled optical system in which the width of the light fluxes incident on a deflecting surface, in the main scanning direction, is smaller than the width of the deflecting surface in the main scanning direction.

Subsequently, the four light fluxes enter a cylindrical lens 4, which can have predetermined refractive power only in the sub scanning direction, and are reflected by a reflecting mirror. Then, in the sub scanning direction, the light fluxes converge to form an image near a deflecting surface 5a of the light deflector 5. In the main scanning direction, the light fluxes enter the deflecting surface 5a of the light deflector 5 while remaining parallel to each other.

The Vcsel used in the present embodiment will be described below.

Because of its structure in which light is emitted in the direction orthogonal to a semiconductor substrate, the Vcsel used in the present exemplary embodiment can be much easier to increase the number of light-emitting parts, achieve two-dimensional parallel integration, and define the layout of light-emitting parts, compared to the case of a known end-face emitting semiconductor laser.

The Vcsel (which can have light-emitting parts with a spacing of 500 μm or less) used in the present embodiment is a monolithic multi-semiconductor laser.

The monolithic multi-semiconductor laser is a laser that is provided with a plurality of light-emitting parts on the same substrate.

The light deflector 5 is driven by a drive unit (not shown), such as a motor, to rotate in a direction indicated by an arrow "A" (FIG. 1) at a constant speed. The four light fluxes deflected by the same deflecting surface 5a of the light deflector 5 enter an imaging optical element 6, which can have f-θ characteristics. In the present embodiment, the imaging optical element 6 is a single lens through which the four light fluxes pass together. After f-θ characteristics and field curvature in the main and sub scanning directions are corrected by the imaging optical element 6, the four light fluxes enter first reflecting mirrors 71k, 71c, 71m, and 71y serving as separation optical elements arranged for the respective light fluxes (see FIG. 3). While some light fluxes are momentarily directed to second reflecting mirrors 72k, 72m, and 72y, the four light fluxes are eventually guided to corresponding photosensitive drums 8k, 8c, 8m, and 8y on the scanned surface 8. Rotating the light deflector 5 in the arrow "A" direction causes optical scanning over the scanned surface 8 in a direction indicated by an arrow "B" (FIG. 1). This allows scanning lines to be formed on the respective photosensitive drums 8k, 8c, 8m, and 8y, thereby performing color image recording.

The imaging optical element 6 serves as a tangle error correction system for correcting a tangle error of each deflecting surface 5a of the light deflector 5. The imaging optical element 6 allows a conjugation relationship between a deflecting point on the deflecting surface 5a and an imaging point on the scanned surface 8.

The separation of a plurality of adjacent light fluxes from the light source element 1, which can have a plurality of light-emitting parts on the same substrate (i.e., light source, which can have a plurality of light-emitting parts on a single substrate) will now be described. There are two known methods for separating a plurality of light fluxes in a sub scanning plane. One is a spatial separation method in which the principal rays of a plurality of light fluxes are collimated, in a sub scanning plane, with respect to a plane (i.e., main scanning plane) orthogonal to the rotational axis of a light deflector. That is, the spatial separation method is a method in which, in a sub scanning plane, the principal rays of a plurality of light fluxes enter a deflecting surface of a light deflector at a right angle. The other is an angular separation method that causes light fluxes to enter a deflecting surface of a light deflector at different angles, thereby separating the plurality of light fluxes in a sub scanning plane.

The spatial separation method is a method that causes four light fluxes to enter the deflecting surface 5a of the light deflector 5 while bringing the four light fluxes to be parallel to each other, and that causes the four light fluxes to be spaced to the extent that they are not spatially superimposed on one another. The most significant problems with this spatial separation method is that the sizes of the light deflector 5 and incidence optical system (including the collimating lens 2 and the cylindrical lens 4) increase in the sub scanning direction, and that it is difficult to share the imaging optical element 6, since the light fluxes are widely separated on the light deflector 5. This leads to increased size and costs of the scanning optical device and cancels out the advantage of facilitating the components extending from the light source element 1 to the incidence optical system to be shared.

On the other hand, the angular separation method is a method that causes four light fluxes to enter, with angular differences in the sub scanning plane, the light deflector 5 at adjacent points (which are technically spaced apart) on the deflecting surface 5a, thereby separating the four light fluxes, using the angular differences in the sub scanning plane, after the four light fluxes have passed through the imaging optical element 6. This method does not increase the sizes of the light deflector 5 and incidence optical system (including the collimating lens 2, diaphragm 3, and cylindrical lens 4) and thus can achieve a compact and inexpensive scanning optical device. However, this method has a problem in that an aberration cannot be easily corrected by the imaging optical element 6, since the light fluxes enter the light deflector 5 at large angles.

This problem can be solved by applying adjustments to the imaging optical element 6. The details will be described below.

The first exemplary embodiment uses the above-described angular separation method, because of its size and cost advantages, that causes four light fluxes to be separated by adjusting them to different angles on the light deflector 5. Since it can be avoided that adjacent light fluxes are superimposed on each other, an angular difference, in the sub scanning direction, between the principal rays of adjacent light fluxes can be greater than the reciprocal of an F number in the sub scanning direction on the light deflector 5.

Therefore, an angular difference θs (in radians) between the principal rays of adjacent light fluxes to be directed to the different photosensitive drums 8k, 8c, 8m, and 8y can satisfy $$\theta s > 1/Fno.Por$$

where Fno.Por is an F number on the light deflector 5 in the sub scanning direction.

The F number "Fno.Por" in the sub scanning direction on the light deflector 5 can be expressed as follows:

$$Fno.Por = \rho/(1.64 \times \lambda \times |\beta so|)$$

where λ is the oscillation wavelength of light fluxes emitted from the light source element 1, βso is the lateral magnification of the imaging optical element 6 in the sub scanning direction, and ρ is a spot diameter in the sub scanning direction on the scanned surface 8. Therefore, an angular difference θs (in radians) between the principal rays of adjacent light fluxes to be directed to the different photosensitive drums 8k, 8c, 8m, and 8y can satisfy $\theta s > (1.64 \times \lambda \times |\beta so|)/\rho$  Condition Expression A The optical parameters on the left side of Condition Expression A will now be described.

Considering aberrations (field curvature and distortion) on the scanned surface 8, in at least one exemplary embodiment the value of the lateral magnification $\beta so$ of the imaging optical element 6 in the sub scanning direction satisfies $0.5 \leq |\beta so| \leq 3.0$.

Considering the resolution of an LBP or a digital copier, in at least one exemplary embodiment the value of a spot diameter $\rho$ in the sub scanning direction on the scanned surface 8 satisfies $30 \leq \rho \leq 100$ (μm).

Considering the oscillation wavelength of the light source element 1 included in the LBP or in the digital copier, the value of the oscillation wavelength $\lambda$ of light fluxes emitted from the light source element 1 can satisfy $380 \leq \lambda \leq 820$ (nm), which includes infrared light (780 nm), visible light (670 nm), blue light (405 nm), and other equivalent wavelengths as known by one of ordinary skill in the relevant art.

Table 1 shows optical design parameters in the first exemplary embodiment. Referring to Table 1, "No." denotes surface numbers, "Ry" denotes curvature radii (mm) in the main scanning direction, "Rz" denotes curvature radii (mm) in the sub scanning direction, "Asph." denotes aspherical surface coefficients, "D" denotes surface spacings (mm), "Glass" denotes the types of materials, and "N" denotes refractive indices.

The diaphragm 3 has a single aperture with an elliptical shape. The aperture measures 3.4 mm wide in the main scanning direction, and 0.8 mm wide in the sub scanning direction.

The entrance surface of the collimating lens 2 made of glass is a flat surface, while the exit surface thereof is a rotationally symmetric aspherical surface.

The shape of the exit surface of the collimating lens 2 is defined as follows:

$$X = \frac{\frac{h^2}{R}}{1 + \sqrt{1 - (1+k)\left(\frac{h}{R}\right)^2}} \quad \text{Equation 1}$$

where X is the optical axis direction and h is the radial direction of the collimating lens 2.

The entrance surface of the cylindrical lens 4 is non-powered (flat) in the main scanning direction, and is aspherical (non-circular) and has a positive power in the sub scanning direction.

The shape of the exit surface of the cylindrical lens 4 made of glass is defined as follows:

$$X = \frac{\frac{Z^2}{R}}{1 + \sqrt{1 - (1+kz)\left(\frac{Z}{R}\right)^2}} \quad \text{Equation 2}$$

where X is the optical axis direction and Z is the sub scanning direction.

TABLE 1

Optical Arrangement

| | No. | Ry | Rz | Asph. | D | Glass | N |
|---|---|---|---|---|---|---|---|
| Light-emitting Part | 1 | | | | 1.75 | | |
| Cover Glass 10 | 2 | ∞ | | | 0.25 | bsl7 | 1.51052 |
| | 3 | ∞ | | | 5.483 | | |
| Collimating Lens 2 | 4 | ∞ | | | 2 | lah66 | 1.76167 |
| | 5 | −6.5 | | K = −6.64E−1 | 2 | | |
| Diaphragm 3 | 6 | | | | 158 | | |
| Cylindrical Lens 4 | 7 | | 9 | Kz = −5.80E−1 | 7 | bsl7 | 1.51052 |
| | 8 | ∞ | | | 12.995 | | |
| Deflecting Surface 5a | 9 | ∞ | | | | | |

Light Source

| | |
|---|---|
| Number of Light-emitting Parts | 4 (1 column by 4 rows) |
| Spacing of Light-emitting Parts (Sub Scanning Direction) | 100 μm |

Angle of Inclination (degrees)

| | θa | θp | \|θp/θa\| |
|---|---|---|---|
| Light-emitting Part 1k | −0.77 | 8.25 | 10.7 |
| Light-emitting Part 1c | −0.26 | 2.68 | 10.4 |
| Light-emitting Part 1m | 0.26 | −2.68 | 10.4 |
| Light-emitting Part 1y | 0.77 | −8.25 | 10.7 |

Others

| | |
|---|---|
| Spot Diameter | Main Scanning Direction × Sub Scanning Direction = 60 × 70 μm |
| Lateral Magnification of Imaging Optical Element 6 in Sub Scanning Direction | βso = −2.36 |

Optical Arrangement

| | No. | Ry | Rz | Asph. | D | Glass | N |
|---|---|---|---|---|---|---|---|
| Deflecting Surface 5a | 9 | | | | 49 | | |
| Imaging Optical Element 6 | 10 | 300 | ∞ | *1 | 21 | Zeonex | 1.50308 |
| | 11 | −98.68 | | *2 | 146.7 | | |
| Scanned Surface 8 | 12 | | | | | | |

Aspherical Surface Coefficient

| Entrance Surface *1 | | Exit Surface *2 | |
|---|---|---|---|
| Ky | −3.18E+01 | E02 | −2.24E−02 |
| B4 | −9.12E−08 | E12 | 1.45E−06 |
| B6 | 2.32E−11 | E22 | 3.14E−07 |
| B8 | −3.55E−15 | E32 | −9.61E−10 |
| B10 | 1.92E−19 | E42 | −8.23E−11 |
| | | E52 | 1.41E−13 |
| | | E62 | 1.90E−15 |
| | | E82 | −3.40E−19 |
| | | E04 | −1.81E−06 |
| | | E14 | 6.64E−10 |
| | | E24 | 6.67E−10 |
| | | E34 | −4.71E−13 |
| | | E44 | −1.15E−13 |
| | | E64 | 3.99E−18 |

The shape of the entrance surface of the imaging optical element 6 is defined as follows:

$$X = \frac{\frac{Y^2}{R}}{1 + \sqrt{1-(1+k)\left(\frac{Y}{R}\right)^2}} + B4 \times Y^4 + B6 \times Y^6 + B8 \times Y^8 + B10 \times Y^{10}$$

Equation 3 where X is the optical axis direction, Y is the main scanning direction, R is the curvature radius along the optical axis in the main scanning direction, and k, B4, B6, B8, and B10 are aspherical surface coefficients.

The shape of an exit surface of the imaging optical element 6 is defined as follows:

$$X = \frac{\frac{Y^2}{R}}{1 + \sqrt{1-(1+k)\left(\frac{Y}{R}\right)^2}} + \sum\sum Eij \times Y^i Z^j$$

Equation 4 where X is the optical axis direction, Y is the main scanning direction, Z is the sub scanning direction, R is the curvature radius along the optical axis in the main scanning direction, and k and Eij are aspherical surface coefficients.

As shown in Table 1, an entrance surface of the imaging optical element 6 made of plastic is aspherical (non-circular) in main scanning cross-sectional shape and flat (linear) in sub scanning cross-sectional shape, and is a cylindrical surface, which can have power (refractive power) only in the main scanning direction. The exit surface of the imaging optical element 6 made of plastic is circular in main scanning cross-sectional shape (in a generatrix direction) and non-circular in sub scanning cross-sectional shape (in a perpendicular-to-generatrix direction), and is a free-form surface where the curvature radius and the aspherical surface area continuously change with distance from the optical axis along the main scanning direction (generatrix direction).

Moreover, the aspherical shape of the aspherical surface in the main scanning plane of the imaging optical element 6 made of plastic has no inflection point in the curvature change.

The shape of the exit surface will now be described in detail.

The exit surface is entirely non-circular (aspherical) in sub scanning cross-sectional shape (in the perpendicular-to-generatrix direction). The absolute value of the curvature radius of the exit surface increases with distance from the optical axis along the main scanning direction. The aspherical surface area of the exit surface also increases with distance from the optical axis along the main scanning direction. Curvature radii in the perpendicular-to-generatrix direction change in an asymmetrical manner at both ends of the optical axis of the imaging optical system and on the left and right sides of the main scanning direction.

With the exit surface shaped as described above, irradiation positions on the photosensitive drums 8k, 8c, 8m, and 8y are brought closer to the optical axis, than the positions, in the sub scanning direction, at which the light fluxes deflected by the light deflector reach the entrance surface and exit surface of the imaging optical element 6. Therefore, by aligning the irradiation positions at image heights, the error in curvature of scanning lines can be reduced to a significant degree.

Although the lens shapes are defined as described above, the present invention is not limited to the above-described definitions.

Figure 11:
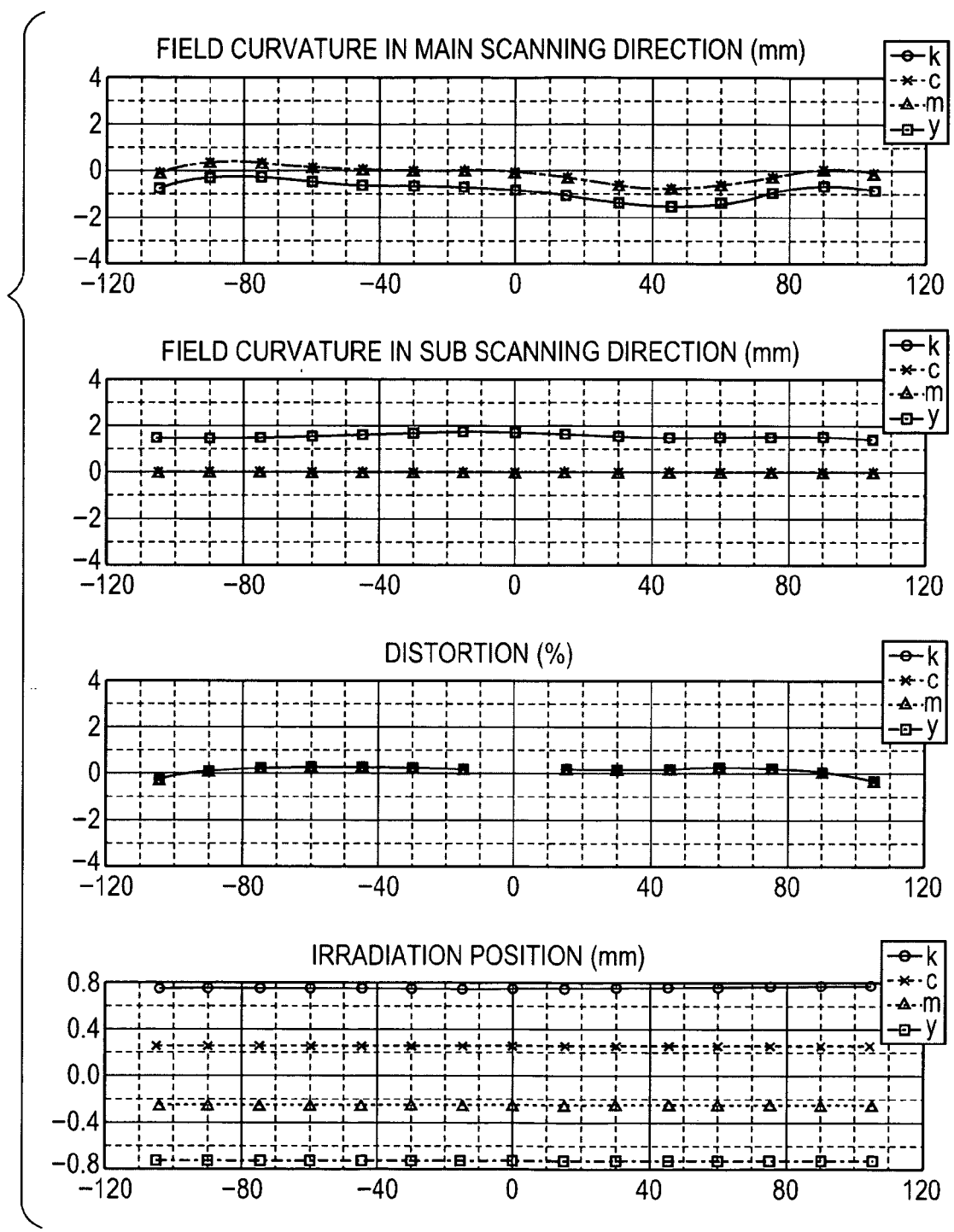
FIG. 11 shows aberration diagrams of the first exemplary embodiment.

FIG. 11 shows optical characteristics (i.e., field curvature in the main scanning direction, field curvature in the sub scanning direction, distortion, and irradiation position) of the scanning optical device of the present embodiment. FIG. 11 shows that substantially problem-free optical characteristics are ensured with respect to every light flux.

In the first exemplary embodiment, where the oscillation wavelength λ of light fluxes emitted from four light-emitting parts of the light source element 1 is 0.78 μm (infrared light), the lateral magnification βso of the imaging optical element 6 in the sub scanning direction is −2.36, and the spot diameter ρ in the sub scanning direction on the scanned surface 8 is 70 μm, the angular difference θs can satisfy θs>0.043 in radians or θs>2.47 in degrees. As shown in Table 1, in the first exemplary embodiment, the angles of the four light fluxes with respect to a plane orthogonal to the rotational axis of the light deflector 5 are ±8.25° and ±2.68°, while the angular differences θs, in the sub scanning direction, between adjacent light fluxes (i.e., 11y and 11m, 11m and 11c, and 11c and 11k) deflected on the same deflecting surface are set to fall within a range of 5.36° to 5.57°. These angles are sufficient to perform angular separation.

The separation optical system of the first exemplary embodiment will now be described. As shown in FIG. 3, in the first exemplary embodiment, the first and second reflecting mirrors 71k, 71y, 71m, 71c, 72k, 72y, and 72m serve as separation optical elements that constitute the separation optical system. After being refracted by the imaging optical element 6, a plurality of light fluxes are deflected by the first and second reflecting mirrors 71k, 71y, 71m, 71c, 72k, 72y, and 72m at different points. While the first and second reflecting mirrors 71k, 71y, 71m, 71c, 72k, 72y, and 72m provide the simplest and most inexpensive method for separating light fluxes, the use of reflective prisms that can reduce the angles between the principal rays of a plurality of light fluxes provides similar effects to those of the first and second reflecting mirrors 71k, 71y, 71m, 71c, 72k, 72y, and 72m.

The first and second reflecting mirrors 71k, 71y, 71m, 71c, 72k, 72y, and 72m of the first exemplary embodiment are flat mirrors.

Although the separation optical system of the first exemplary embodiment is structured such that each light flux corresponds to one of a reflecting mirror 71c, pairs of reflecting mirrors (71k and 72k), (71y and 72y), and (71m and 72m), the structure of the separation optical system is not limited to this.

For example, the separation optical system can be structured in such a way that every light flux corresponds to a single reflecting mirror, or that every light flux corresponds to two or more reflecting mirrors.

Next, the imaging optical element 6 of the first exemplary embodiment will be described. In the present embodiment, since light fluxes are separated by the angular separation method, light fluxes emitted from the light deflector 5 enter the imaging optical element 6 at large angles that vary in the sub scanning direction, and aberration correction can be applied contemporaneously to such light fluxes of varying angles.

Figure 4:
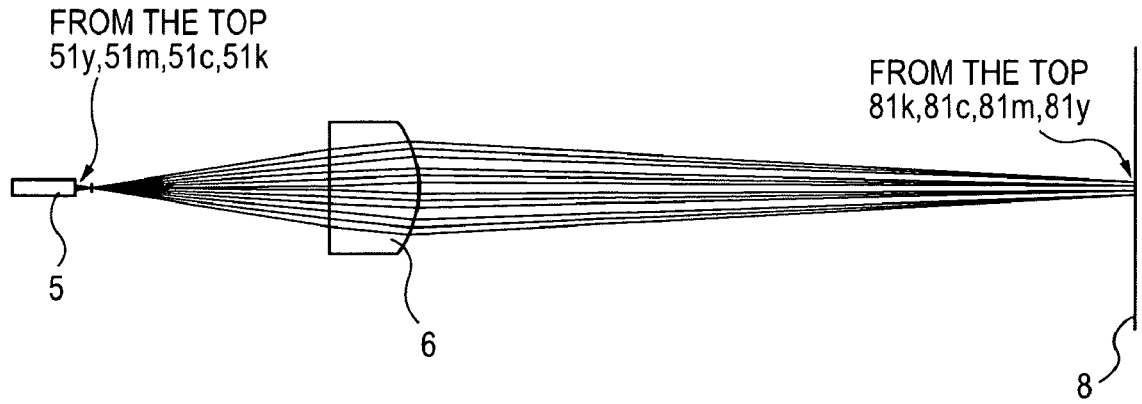
FIG. 4 shows a plane in the sub scanning plane extending from the light deflector to the surface to be scanned in the scanning optical device, according to the first exemplary embodiment.

FIG. 4 shows a sub scanning plane ranging from the light deflector 5 to scanned surface 8 of the scanning optical device, according to the first exemplary embodiment. FIG. 4 is equivalent to FIG. 3 except that the separation optical system shown in FIG. 3 is omitted. As shown in FIG. 4, since a plurality of light fluxes are separated by the angular separation method in the first exemplary embodiment, four light fluxes 51$k$, 51$c$, 51$m$, and 51$y$ on the deflecting surface 5$a$ of the light deflector 5 and four light fluxes 81$k$, 81$c$, 81$m$, and 81$y$ on the scanned surface 8 are in close proximity to one another. The spacing of the four light fluxes on each of the deflecting surface 5$a$ and the scanned surface 8 is less than or equal to 100 μm, which is much smaller than the focal length of the imaging optical element 6. Therefore, there is optically no problem if the positions of four light fluxes on each of two locations are treated as a single point.

In this case, light fluxes diverge from approximately one point and converge to another point to form an image. To simultaneously correct for the aberration of a plurality of light fluxes of varying angles, the imaging optical element 6 can be reduced for spherical aberration in the sub scanning direction, at each position in the main scanning direction, within a range through which the four light fluxes pass.

Therefore, in the first exemplary embodiment, the exit surface of the imaging optical element 6 is non-circular in the sub scanning direction, and the non-circular surface area in the sub scanning direction changes along the axis in the main scanning direction. This allows correction for spherical aberration in the sub scanning direction at every scanning position (every image height). Even if the incidence angles in the sub scanning direction are large, field curvatures in the sub scanning direction of a plurality of light fluxes, and the scanning-line curvatures of a plurality of light fluxes can be reduced. The above-described problem of the angular separation method can be overcome with the simple structure of the imaging optical element 6.

The imaging optical system of the first exemplary embodiment includes a single lens. However, even if the imaging optical system includes multiple imaging optical elements, and even if the incidence angles in the sub scanning direction are large, it is still possible to correct for the field curvatures in the sub scanning direction of a plurality of light fluxes and the scanning-line curvatures of a plurality of light fluxes.

For example, the imaging optical system can have a structure in which a shared first imaging lens through which four light fluxes pass is disposed adjacent to the light deflector 5, while four second imaging lenses for respective light fluxes are disposed adjacent to the scanned surface 8.

Next, the light source element 1 of the first exemplary embodiment will be described. As described above, the light source element 1 of the present embodiment is a Vcsel, which can have four light-emitting parts that are adjacent to one another.

Because of its structure in which light is emitted in the direction orthogonal to a semiconductor substrate, the Vcsel can be much easier to increase the number of light-emitting parts, achieve two-dimensional parallel integration, and define the layout of light-emitting parts, compared to the case of a known end-face emitting semiconductor laser.

Therefore, compared to a known end-face emitting semiconductor laser, the Vcsel is more suitable for the separation of light fluxes from a single light source element. The Vcsel can also be structured such that light fluxes from eight light-emitting parts are directed to the four photosensitive drums 8$k$, 8$c$, 8$m$, and 8$y$, with two light fluxes for each photosensitive drum, or such that light fluxes from 16 light-emitting parts are directed to the four photosensitive drums 8$k$, 8$c$, 8$m$, and 8$y$, with four light fluxes for each photosensitive drum.

Therefore, in at least one exemplary embodiment the number of light-emitting parts in the light source element 1 be an integral multiple of the number of photosensitive drums.

Figure 5A:
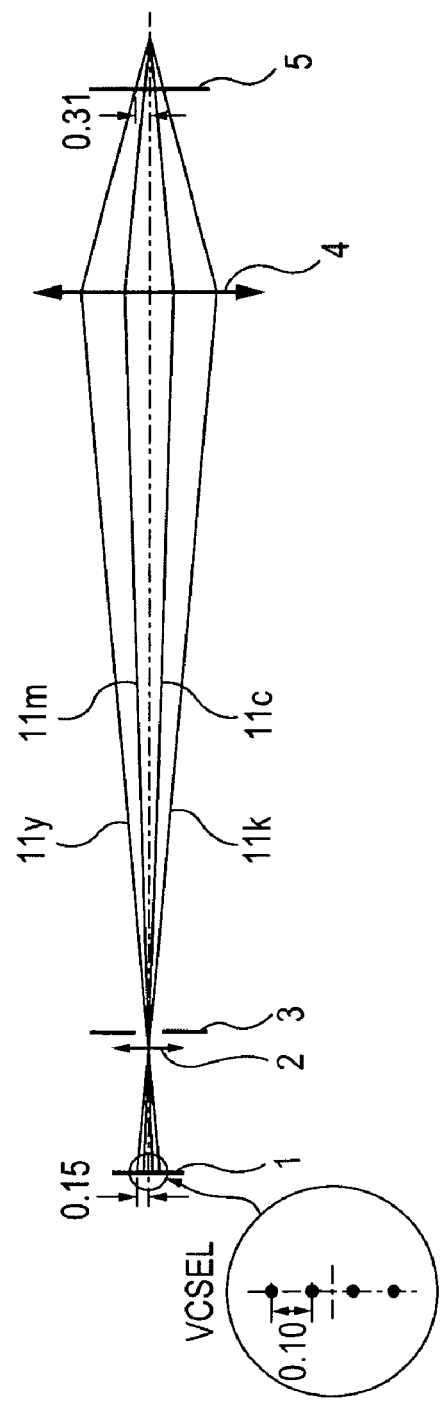
FIG. 5A and FIG. 5B each show a plane in the sub scanning plane extending from the light source element to light deflector of the scanning optical device, according to the first exemplary embodiment.
Figure 5B:
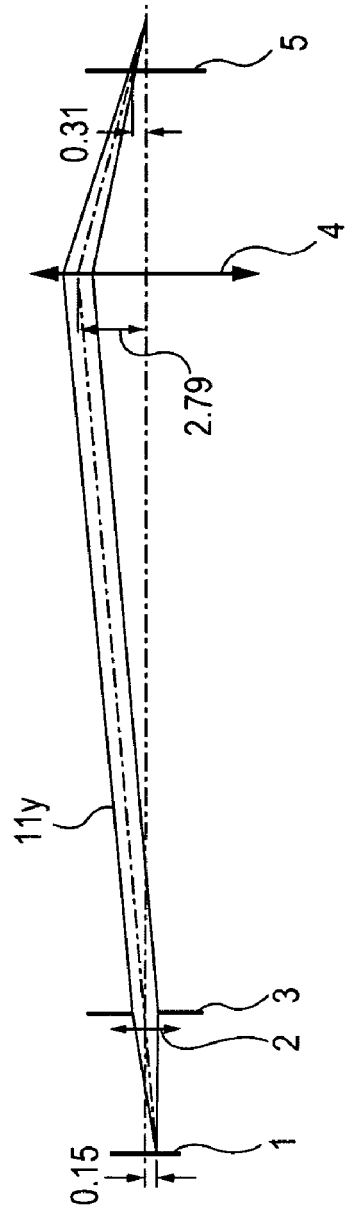

Next, the incidence optical system (i.e., optical system extending from the light source element 1 to the light deflector 5) of the first exemplary embodiment will be described. FIG. 5A and FIG. 5B each show a sub scanning plane extending from the light source element 1 to light deflector 5 of the scanning optical device, according to the first exemplary embodiment. FIG. 5A shows only the principal rays of four light fluxes. FIG. 5B shows one of the four principal rays and marginal rays. The four light fluxes emitted from the single light source element 1 are collimated by the collimating lens 2 and enter the diaphragm 3 disposed right next to the collimating lens 2. The principal rays of the four light fluxes intersect one another at the same point in the aperture of the diaphragm 3.

The exit angle of the principal ray of each of the plurality of light fluxes is defined by the spacing from the optical axis of each light-emitting part and by the position of the diaphragm 3. To increase the exit angle from the light source element 1 in the sub scanning direction, in at least one exemplary embodiment the diaphragm 3 be disposed closer to the light source element 1 than it is to the light deflector 5.

The plurality of light fluxes from the diaphragm 3 are refracted by the cylindrical lens 4 toward the conjugate points, which are located after the light deflector 5, of the diaphragm 3. To increase the incidence angle, in the sub scanning direction, of the principal ray of each of the plurality of light fluxes entering the same deflecting surface 5$a$ of the light deflector 5 (in other words, to increase an angle from the plane orthogonal to the rotational axis of the light deflector 5), in at least one exemplary embodiment the imaging by the cylindrical lens 4, in the sub scanning plane, between the diaphragm 3 and its conjugate point can form a reduced image (|β$si$|≦1).

Therefore, if the absolute value of the lateral magnification of the cylindrical lens 4, in the sub scanning direction, between the diaphragm 3 and its conjugate point satisfies |β$si$|≦1, the exit angles of the principal rays of the plurality of light fluxes from the light source element 1 can be increased in the sub scanning plane.

In other words, the incidence angle, in the sub scanning direction, of the principal ray of a light flux entering the deflecting surface 5$a$ is defined as the angle that is formed, in the sub scanning plane, by the normal to the deflecting surface 5$a$ of the light deflector 5 and the principal ray of the light flux.

In this case, in at least one exemplary embodiment the lateral magnification β$si$, between the diaphragm 3 and its conjugate point in the sub scanning direction, of the cylindrical lens 4 satisfies the condition 1/20<|β$si$|<1/3.

This condition is equivalent to 3<θ$p$/θ$a$<20, where θ$a$ is the angle of inclination, in the sub scanning direction, of the principal ray of a light flux from the diaphragm 3 with respect to the optical axis of the cylindrical lens 4, and θ$p$ is the angle of inclination, in the sub scanning direction, of the principal ray of the light flux entering the light deflector 5.

If the upper limit of this condition is exceeded, it becomes difficult to add the incidence optical system, because the increased distance between the diaphragm 3 and the cylindrical lens 4 reduces the distance between the cylindrical lens 4 and the deflecting surface 5a of the light deflector 5. If the lower limit of this condition is exceeded, a separation angle necessary for the separation of a plurality of light fluxes cannot be ensured.

It is preferable that the condition $1/15<|\beta si|<1/8$ is also satisfied.

In the first exemplary embodiment, as shown in Table 1, the angle of inclination θa, in the sub scanning direction, of the principal ray of a light flux emitted from a light-emitting part at the bottom of the light source element 1 with respect to the optical axis of the cylindrical lens 4 is set to 0.77°, while the angle of inclination θp, in the sub scanning direction, of the principal ray of the light flux entering the light deflector 5 is set to −8.25°. This gives |θp/θa|=10.7, which not only allows the installation of the incidence optical system (including collimating lens 2, diaphragm 3, and cylindrical lens 4) but also allows the separation of a plurality of light fluxes at positions after the light deflector 5. Although the angles of inclination of the other three light fluxes in the sub scanning direction vary, the values of |θp/θa| are the same.

As for the size of the incidence optical system of the first exemplary embodiment, since the spacing between the principal rays of a plurality of light fluxes on the cylindrical lens 4 is as large as 5.6 mm, the cylindrical lens 4 can have an outside diameter corresponding to this spacing. However, this size is smaller than that in the case of the known optical systems in which the principal rays of a plurality of light fluxes are parallel, in a sub scanning plane, with respect to a plane (main scanning plane) orthogonal to the rotational axis of a light deflector (i.e., known optical systems in which the principal rays of a plurality of light fluxes enter, in a sub scanning plane, a deflecting surface of a light deflector at a right angle). Moreover, it is easy to adjust the size of the cylindrical lens 4 to accommodate this spacing, as it can be made of plastic.

Since light fluxes (which are technically spaced apart) are spatially almost superimposed on one another on the collimating lens 2, which is preferably made of glass, and on the light deflector 5, which is made of metal, the sizes of the collimating lens 2 and light deflector 5 can be the same as those of known types.

Therefore, the incidence optical system of the first exemplary embodiment can be an improvement over the known optical systems in which the principal rays of a plurality of light fluxes are parallel, in a sub scanning plane, with respect to a plane (main scanning plane) orthogonal to the rotational axis of a light deflector (i.e., known optical systems in which the principal rays of a plurality of light fluxes enter, in a sub scanning plane, a deflecting surface of a light deflector at a right angle), and which are large in size due to the use of optical elements that are relatively expensive in terms of processing.

In the first exemplary embodiment, imaging by the cylindrical lens 4, in the sub scanning plane, between the diaphragm 3 and its conjugate point (located after the deflecting surface 5a) forms a reduced image ($1/20<|\beta si|<1/3$). Therefore, with the simple structure of the incidence optical system, and without increasing the size and cost of the entire apparatus, angular differences in the sub scanning direction that are required for separating, on the light deflector 5, a plurality of light fluxes emitted from a plurality of adjacent light-emitting parts can be ensured.

First Modification

In the first exemplary embodiment, a single f-θ lens serves as the imaging optical element that constitutes the imaging optical system. However, the present invention is not limited to this, and two or more f-θ lenses, instead of a single f-θ lens, can be used. The imaging optical element can even be a diffractive optical element or a curved mirror, instead of a lens.

Although the underfilled optical system is used in the first exemplary embodiment, an overfilled optical system in which the width of light fluxes incident on a deflecting surface, in the main scanning direction, is larger than the width of the deflecting surface in the main scanning direction can be used, instead.

Instead of flat reflecting mirrors used in the first exemplary embodiment, curved mirrors can be used as the separation optical elements that constitute the separation optical system. In this case, imaging capabilities are added to the curved mirrors.

The light source element 1 of the first exemplary embodiment is a Vcsel (monolithic multi-semiconductor laser), which can have a plurality of light-emitting parts on a single substrate. However, a light source can be one in which a plurality of end-face emitting semiconductor lasers, each of which can have a plurality of light-emitting parts, are disposed with a minute spacing (of 500 µm or less).

For example, instead of a Vcsel in the first exemplary embodiment, a light source in which two end-face emitting semiconductor lasers, each of which can have two light-emitting parts are disposed with a minute spacing (of 500 µm or less), can be used.

Second Exemplary Embodiment

Figure 7:
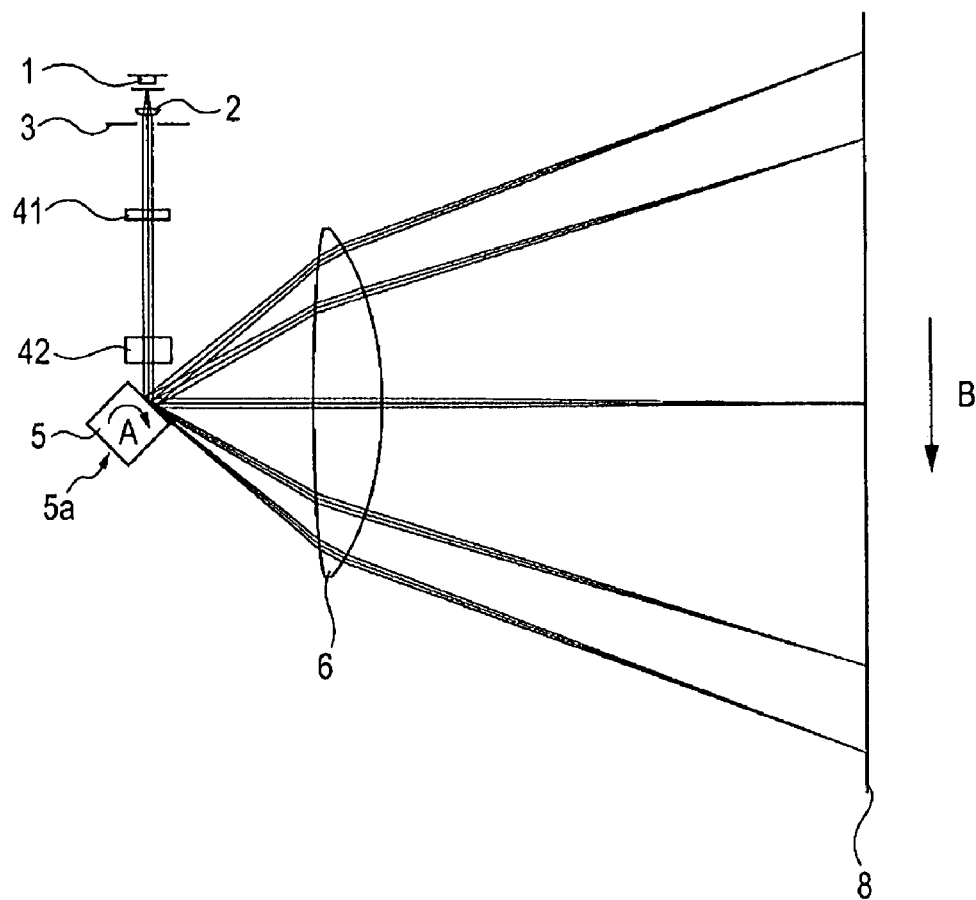
FIG. 7 shows a plane in the main scanning plane of a scanning optical device according to a second exemplary embodiment.
Figure 8:
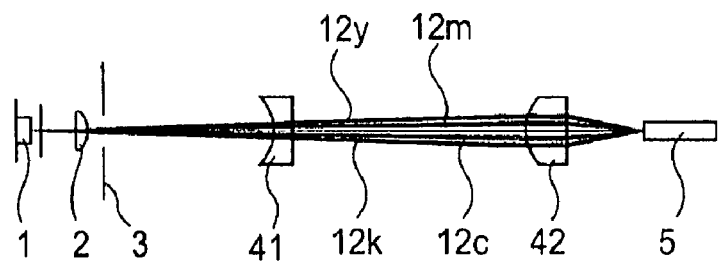
FIG. 8 shows a plane in the sub scanning plane extending from a light source element to a light deflector in the scanning optical device, according to the second exemplary embodiment.
Figure 9:
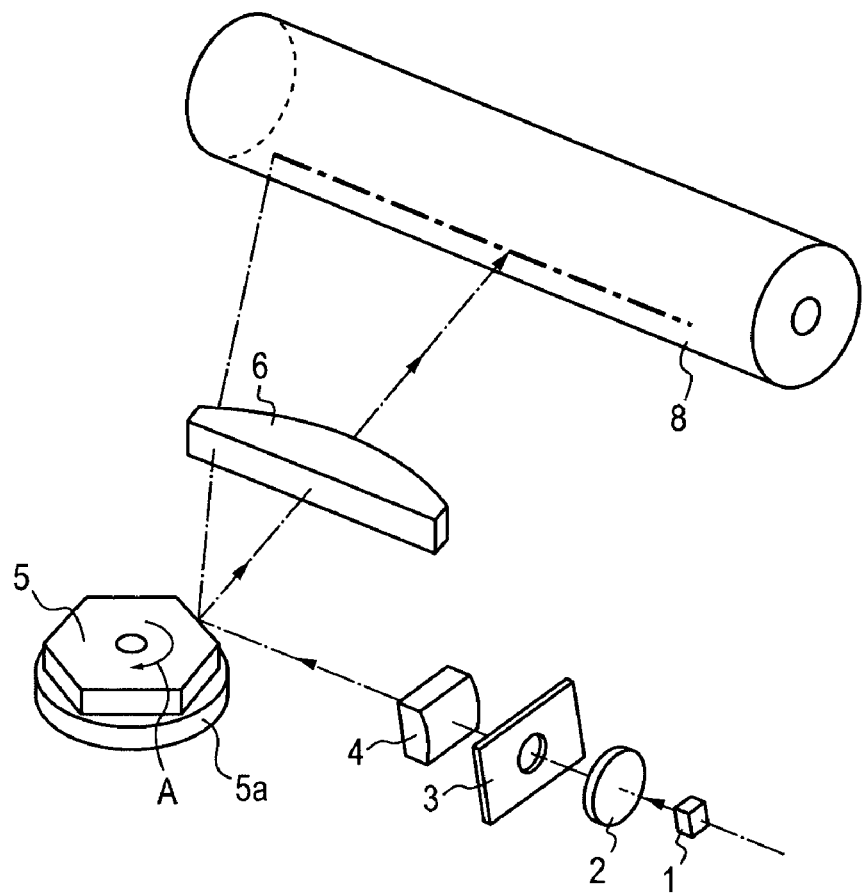
FIG. 9 is a perspective view of a known scanning optical device.

FIG. 7 shows a main scanning plane of a scanning optical device according to the second exemplary embodiment. FIG. 8 shows a sub scanning plane extending from a light source element 1 to a light deflector 5 in the scanning optical device, according to the second exemplary embodiment. The second exemplary embodiment is substantially the same as the first exemplary embodiment except that the light source element 1 has a two-dimensional array of light-emitting parts and that a concave lens is added to an incidence optical system.

Figure 10:
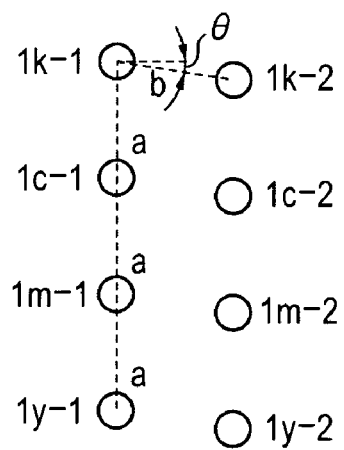
FIG. 10 illustrates the array of light-emitting parts in the light source element of the scanning optical device according to the second exemplary embodiment.

The light source element 1 of the second exemplary embodiment is also a Vcsel. As shown in FIG. 10, the light source element 1 has a two-dimensional array of eight light-emitting parts 1k-1, 1k-2, 1m-1, 1m-2, 1c-1, 1c-2, 1y-1, and 1y-2 arranged in two columns (corresponding to the main scanning direction) by four rows (corresponding to the sub scanning direction).

The Vcsel (which can have light-emitting parts with a spacing of 500 µm or less) used in the present embodiment is a monolithic multi-semiconductor laser.

The monolithic multi-semiconductor laser is a laser that is provided with a plurality of light-emitting parts on the same substrate.

As shown in FIG. 10, the array of light-emitting parts in the present embodiment is a two-dimensional array where a line segment connecting light-emitting parts in the row direction (corresponding to the sub scanning direction) does not intersect with a line segment connecting light-emitting parts in the column direction (corresponding to the main scanning direction). However, the light source element 1 that has the array of light-emitting parts where such line segments intersect at right angles can be used and rotated about the normal of the substrate of the light-emitting parts.

Eight light fluxes emitted from the light source element 1 are collimated by a collimating lens 2 and enter a diaphragm 3 disposed right next to the collimating lens 2. The principal rays of the eight light fluxes intersect each other at the position of an aperture of the diaphragm 3. FIG. 7 shows only a single light flux for simplicity, and the other light fluxes are not shown.

FIG. 8 shows only four light fluxes 12$k$, 12$m$, 12$c$, and 12$y$ separated in the sub scanning direction and the other four light fluxes 12$k$-2, 12$m$-2, 12$c$-2, and 12$y$-2 are not shown, as they are superimposed on the four light fluxes shown.

The plurality of light fluxes from the diaphragm 3 are refracted by a cylindrical lens 41, which can have a negative power only in the sub scanning direction, and refracted by a cylindrical lens 42, which can have a positive power only in the sub scanning direction toward the conjugate points of the diaphragm 3 and which are located after the light deflector 5. As in the case of the first exemplary embodiment, in order to increase the incidence angle, in the sub scanning direction, of the principal ray of each of the plurality of light fluxes entering the same deflecting surface of the light deflector 5 (in other words, in order to increase an angle from the plane orthogonal to the rotational axis of the light deflector 5), in at least one exemplary embodiment the imaging by the cylindrical lenses 41 and 42, in the sub scanning plane, between the diaphragm 3 and its conjugate point can form a reduced image.

Therefore, if the absolute values of the lateral magnification of the cylindrical lenses 41 and 42, in the sub scanning direction, between the diaphragm 3 and its conjugate point satisfies $|\beta si| \leq 1$, the exit angles of the principal rays of the plurality of light fluxes from the light source element 1 can be increased in the sub scanning plane.

In particular, in the second exemplary embodiment, since the cylindrical lens 41, which can have a negative power only in the sub scanning direction, is placed between the diaphragm 3 and the cylindrical lens 42, which can have a positive power only in the sub scanning direction, to provide a pair of negative and positive cylindrical lenses, the position of the principal plane defined by the two cylindrical lenses can be shifted in the sub scanning direction toward the light deflector 5. This keeps the lateral magnification lower without leaving much distance between the diaphragm 3 and the cylindrical lens 42, that is, increases the incidence angle, in the sub scanning direction, of the principal ray of each of the plurality of light fluxes entering the same deflecting surface of the light deflector 5.

In other words, the incidence angle, in the sub scanning direction, of the principal ray of a light flux entering the deflecting surface is defined as an angle formed by the normal to the deflecting surface of the light deflector 5 and the principal ray of the light flux.

Table 2 shows optical design parameters in the second exemplary embodiment. Referring to Table 2, "No." denotes surface numbers, "Ry" denotes curvature radii (mm) in the main scanning direction, "Rz" denotes curvature radii (mm) in the sub scanning direction, "Asph." denotes aspherical surface coefficients, "D" denotes surface spacings (mm), "Glass" denotes the types of materials, and "N" denotes refractive indices.

The entrance surface of the collimating lens 2 made of glass is a flat surface, while the exit surface thereof is a rotational symmetric aspherical surface.

The diaphragm 3 is elliptical in shape. The diaphragm 3 has an aperture measuring 3.4 mm wide in the main scanning direction and 0.8 mm wide in the sub scanning direction.

The entrance surface of the cylindrical lens 41 is non-powered (flat) in the main scanning direction, and is aspherical (non-circular) and has a negative power in the sub scanning direction.

The entrance surface of the cylindrical lens 42 is non-powered (flat) in the main scanning direction, and is aspherical (non-circular) and has a positive power in the sub scanning direction.

The shapes of the collimating lens 2, cylindrical lens 41, and cylindrical lens 42 are defined by the same equations as those in the first exemplary embodiment.

TABLE 2

| Optical Arrangement | | | | | | |
|---|---|---|---|---|---|---|
| | No. | Ry | Rz | Asph. | D | Glass | N |
| Light-emitting Part | 1 | | | | 1.75 | | |
| Cover Glass 10 | 2 | ∞ | | | 0.25 | bsl7 | 1.51052 |
| | 3 | ∞ | | | 5.483 | | |
| Collimating Lens 2 | 4 | ∞ | | | 2 | lah66 | 1.76167 |
| | 5 | −6.5 | | K = −6.64E−1 | 2 | | |
| Diaphragm 3 | 6 | | | | 25 | | |
| First Cylindrical Lens 41 | 7 | ∞ | −9.5 | | 3 | lah66 | 1.76167 |
| | 8 | ∞ | | | 35 | | |
| Second Cylindrical Lens 42 | 9 | ∞ | 6.5 | Kz = −5.80E−1 | 7 | bsl7 | 1.51052 |
| | 10 | ∞ | | | 12.546 | | |
| Deflecting Surface 5a of Light Deflector 5 | 11 | ∞ | | | | | |

| Light Source | |
|---|---|
| Number of Light-emitting Parts | 8 (2 columns by 4 rows) |
| Spacing of Light-emitting Parts a (Sub Scanning Direction) | 100 μm |
| Spacing of Light-emitting Parts b (Main Scanning Direction) | 100 μm |

| Angle of Inclination (degrees) | | | |
|---|---|---|---|
| | θa | θp | |θp/θa| |
| Light-emitting Part 1k-1 | −0.73 | 7.64 | 10.5 |
| Light-emitting Part 1c-1 | −0.21 | 2.14 | 10 |
| Light-emitting Part 1m-1 | 0.3 | −3.01 | 10 |
| Light-emitting Part 1y-1 | 0.81 | −8.65 | 10.6 |

| Others | |
|---|---|
| Spot Diameter | Main Scanning Direction × Sub Scanning Direction = 60 × 70 μm |
| Lateral Magnification of Imaging Optical Element 6 in Sub Scanning Direction | βso = −2.36 |

The structures and arrangement of an imaging optical element (f-θ lens) 6 and a separation optical system that are disposed after the light deflector 5 are the same as those of the first exemplary embodiment. The optical characteristics based on such structures and arrangement are also the same as those of the first exemplary embodiment.

Related to the first exemplary embodiment, in at least one exemplary embodiment the lateral magnification βsi, between the diaphragm 3 and its conjugate points in the sub scanning direction, of the cylindrical lenses 41 and 42 satisfies the condition $\frac{1}{20}<|\beta si|<\frac{1}{3}$.

This condition is equivalent to 3<θp/θa<20, where θa is the angle of inclination, in the sub scanning direction, of the principal ray of a light flux from the diaphragm 3 with respect to the optical axis of the cylindrical lens 42, and θp is the angle of inclination, in the sub scanning direction, of the principal ray of the light flux entering the light deflector 5.

If the upper limit of this condition is exceeded, it becomes difficult to add the incidence optical system, because the increased distance between the diaphragm 3 and the cylindrical lens 42 reduces the distance between the cylindrical lens 42 and the deflecting surface 5a. If the lower limit of this condition is exceeded, a separation angle necessary for the separation of a plurality of light fluxes cannot be ensured.

It is preferable that the condition $\frac{1}{20}<|\beta si|<\frac{1}{3}$ is satisfied.

In the second exemplary embodiment, as shown in Table 2, the angle of inclination θa, in the sub scanning direction, of the principal ray of a light flux emitted from a light-emitting part at the bottom of the light source element 1 with respect to the optical axis of the cylindrical lens 42 is set to 0.81°, while the angle of inclination θp, in the sub scanning direction, of the principal ray of the light flux entering the light deflector 5 is set to −8.65°. This gives |θp/θa|=10.6, which not only allows the installation of the incidence optical system but also allows the spatial separation of a plurality of light fluxes in the light path between the imaging optical element 6 and the scanned surface 8 that are arranged after the light deflector 5.

As shown in Table 2, to prevent adjacent light fluxes from being superimposed on each other in the sub scanning plane, an angle θs between the principal rays of adjacent light fluxes deflected on the same deflecting surface, and to be directed to different photosensitive drums, can satisfy the condition θs>(1.64×λ×|βso|)/ρ in radians or θs>2.47 in degrees. Related to the first exemplary embodiment, the angular differences θs, in the sub scanning direction, between adjacent light fluxes deflected on the same deflecting surface are set to fall within a range of 5.15° to 5.64°. That is, angles sufficient for the angular separation of a plurality of light fluxes in the sub scanning plane are given.

Since the deflecting surface 5a of the light deflector 5 is flat, θs and θp are equal.

As shown in FIG. 7, the imaging optical system of the second exemplary embodiment includes a single imaging optical element 6.

The imaging optical element 6 serves as a tangle error correction system for correcting a tangle error of the deflecting surface 5a of the light deflector 5. The imaging optical element 6 allows a conjugation relationship between a deflecting point on the deflecting surface 5a and an imaging point on the scanned surface 8.

Eight light fluxes from the light deflector 5 pass through the shared imaging optical element 6, enter seven reflecting mirrors 71k, 71y, 71m, 71c, 72k, 72y, and 72m serving as separation optical elements, with two light fluxes in each reflecting mirror, and are directed to the respective four surfaces of photosensitive drums 8k, 8c, 8m, and 8y, with two light fluxes in each photosensitive drum. Multibeam scanning is thus performed on the single scanned surface 8.

The separation optical system of the second exemplary embodiment includes the seven reflecting mirrors 71k, 71y, 71m, 71c, 72k, 72y, and 72m serving as separation optical elements.

The imaging optical system used in the second exemplary embodiment is the same as that used in the first exemplary embodiment and shown in FIG. 3.

Thus, in the second exemplary embodiment, related to the first exemplary embodiment, angular differences in the sub scanning direction that are required for separating, on the light deflector 5, a plurality of light fluxes from a plurality of adjacent light-emitting parts can be ensured, with a simple structure of the incidence optical system, and without increasing the size and cost of the entire apparatus.

Thus, a plurality of light fluxes from the single light source element 1 are guided to the light deflector 5 by the shared incidence optical system, deflected by the same deflecting surface 5a of the light deflector 5, and directed by the separation optical system composed of the separation optical elements onto different photosensitive drums corresponding to respective colors. A scanning optical device and a color image forming apparatus that are small in size and low in cost are thus achieved.

In the second exemplary embodiment, with a two-dimensional array of light-emitting parts of a Vcsel serving as the light source element 1, a plurality of light fluxes can be simultaneously directed to the respective surfaces of each of the photosensitive drums 8k, 8c, 8m, and 8y, and in that the use of the cylindrical lens 41 with negative power in the sub scanning direction further reduces the size of the incidence optical system. This further reduces the size of the scanning optical device and color image forming apparatus, and increases the scanning speed thereof.

In the second exemplary embodiment, imaging by the cylindrical lenses 41 and 42, in the sub scanning plane, between the diaphragm 3 and its conjugate points (located behind the deflecting surface 5a) forms a reduced image ($\frac{1}{20}<|\beta si|<\frac{1}{3}$). Therefore, with the simple structure of the incidence optical system, and without increasing the size and cost of the entire apparatus, angular differences in the sub scanning direction that are required for separating, on the light deflector 5, a plurality of light fluxes emitted from a plurality of adjacent light-emitting parts can be ensured.

Second Modification

In the second exemplary embodiment, a single f-θ lens serves as the imaging optical element that constitutes the imaging optical system. However, the present invention is not limited to this, and two or more f-θ lenses, instead of a single f-θ lens, can be used. The imaging optical element can even be a diffractive optical element or a curved mirror, instead of a lens.

Although an underfilled optical system is used in the second exemplary embodiment, an overfilled optical system in which the width of light fluxes incident on a deflecting surface, in the main scanning direction, is larger than the width of the deflecting surface in the main scanning direction can be used, as an alternative.

Instead of flat reflecting mirrors used in the second exemplary embodiment, curved mirrors can be used as the separation optical elements that constitute the separation optical system. In this case, imaging capabilities are added to the curved mirrors.

The light source element 1 of the second exemplary embodiment is a Vcsel (monolithic multi-semiconductor laser), which can have a plurality of light-emitting parts on a single substrate. However, a light source can be one in which a plurality of end-face emitting semiconductor lasers, each which can have a plurality of light-emitting parts, are disposed with a minute spacing (of 500 µm or less).

For example, instead of a Vcsel in the second exemplary embodiment, a light source in which two end-face emitting semiconductor lasers, each which can have four light-emitting parts, are disposed with a minute spacing (of 500 µm or less) can be used.

Third Exemplary Embodiment

Figure 6:
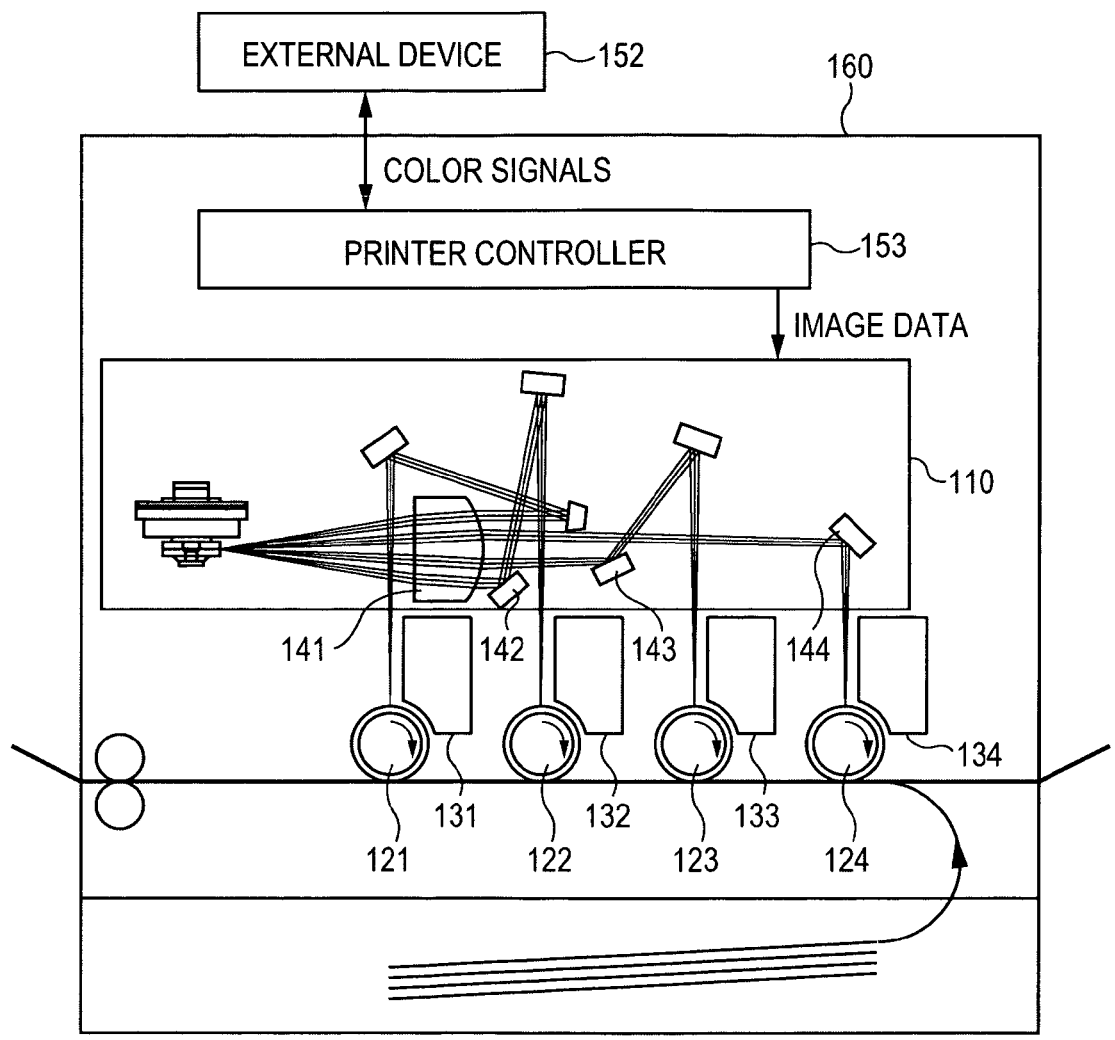
FIG. 6 shows an image forming apparatus according to a third exemplary embodiment.

FIG. 6 shows a substantial part of a color image forming apparatus 160 of the present embodiment. Referring to FIG. 6, the color image forming apparatus 160 includes scanning optical devices 110, which can have the respective structures of the first and/or second exemplary embodiments, photosensitive drums 121, 122, 123, and 124 each serving as an image carrier, developing units 131, 132, 133, and 134, and a transport belt.

In FIG. 6, red (R), green (G), and blue (B) color signals are inputted from an external device 152, such as a personal computer, to the color image forming apparatus 160. These image signals are converted by a printer controller 153 in the color image forming apparatus 160 into respective image data (dot data) of cyan (C), magenta (M), yellow (Y), and black (B), which are inputted to the scanning optical devices 110. Light beams 141, 142, 143, and 144 modulated according to the respective image data are emitted from the optical scanning devices 110. The photosensitive drums 121, 122, 123, and 124 are scanned with these light beams in the main scanning direction.

As described above, the color image forming apparatus of the present embodiment forms the latent images of the respective colors on the corresponding surfaces of the photosensitive drums 121, 122, 123, and 124 using the four light beams based on the respective image data from the scanning optical devices 110, and then creates a single full-color image on a recording medium by multiple transfer of the latent images.

For example, a color image reading apparatus including a charge-coupled device (CCD) sensor can be used as the external device 152. In this case, the color image reading apparatus and the color image forming apparatus 160 are put together to produce a color digital copier.

In the present embodiment, with the use of the incidence optical system with known components (such as the collimating lens 2, the diaphragm 3, and the cylindrical lens 4) alone, angular differences required for separating, on the light deflector 5, a plurality of light fluxes from adjacent light-emitting parts can be given without increasing the size and cost of the entire apparatus. This provides an optical system in which a plurality of light fluxes from the single light source element 1 are guided to the light deflector 5 by the shared incidence optical system, deflected by the light deflector 5, and directed by the separation optical system, including mirrors, into photosensitive drums corresponding to respective colors, thereby achieving a scanning optical device and an image forming apparatus that are small in size and inexpensive.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A scanning optical device comprising:
a monolithic multi-laser having a plurality of light-emitting parts;
a diaphragm;
a light deflector configured to deflect, on the same deflecting surface, all of the plurality of light fluxes emitted from the plurality of light-emitting parts;
an incidence optical system disposed in a light path between the monolithic multi-laser and the light deflector, and the incidence optical system being configured to cause all of the plurality of light fluxes emitted from the plurality of light-emitting parts to pass through a same aperture of the diaphragm and being configured to cause the principal rays of all of the plurality of light fluxes to enter the same deflecting surface of the light deflector at different angles in a sub scanning section;
a separation optical system configured to direct the plurality of light fluxes deflected on the same deflecting surface of the light deflector into different photosensitive members;
an imaging optical system configured to cause the plurality of light fluxes deflected on the same deflecting surface to form images on the different photosensitive members; and
a lateral magnification $\beta si$, between the diaphragm and its conjugate point in the sub scanning direction, of an optical system disposed in a light path between the diaphragm and the light deflector, satisfies $1/20 < |\beta si| < 1/3$.

2. The scanning optical device according to claim 1, wherein an angular difference $\theta s$ in radians, in the sub scanning direction, between the principal rays of adjacent light fluxes of a plurality of light fluxes incident on the same deflecting surface of the light deflector and deflected from the same deflecting surface onto the different photosensitive members, satisfies $$\theta s < (1.64 \times \lambda \times |\beta so|)/\rho$$

where $\lambda$ is the oscillation wavelength of the light fluxes, $\beta so$ is the lateral magnification of the imaging optical system in the sub scanning direction, and $\rho$ is a spot diameter in the sub scanning direction on one of the photosensitive member.

3. The scanning optical device according to claim 1, wherein the imaging optical system includes an imaging lens through which all of a plurality of light fluxes deflected on the same deflecting surface of the light deflector pass.

4. The scanning optical device according to claim 1, wherein the separation optical system includes mirrors for each of a plurality of light fluxes deflected on the same deflecting surface of the light deflector.

5. The scanning optical device according to claim 1, wherein the diaphragm is disposed closer to the monolithic multi-laser than the diaphragm is to the light deflector, in a light path from the monolithic multi-laser to the light deflector.

6. A color image forming apparatus comprising:
the scanning optical device according to claim 1;
a plurality of photosensitive members;
a plurality of developing units corresponding to the respective plurality of photosensitive members and configured to develop static latent images, which are formed on the respective photosensitive members through scanning with light fluxes by the scanning optical device, into a toner image;

a plurality of transfer units corresponding to the respective plurality of developing units and configured to transfer the developed toner image to a transfer medium; and a fuser configured to fuse the transferred toner image to the transfer medium.

7. A color image forming apparatus comprising:

a plurality of scanning optical devices according to claim 1;

a plurality of photosensitive members;

a plurality of developing units corresponding to the respective plurality of photosensitive members and configured to develop static latent images, which are formed on the respective photosensitive members through scanning with light fluxes by the plurality of scanning optical devices, into a toner image;

a plurality of transfer units corresponding to the respective plurality of developing units and configured to transfer the developed toner image to a transfer medium; and a fuser configured to fuse the transferred toner image to the transfer medium.

* * * * *